(12) United States Patent
Fraser et al.

(10) Patent No.: US 7,082,892 B1
(45) Date of Patent: Aug. 1, 2006

(54) CAT LITTER BOX

(76) Inventors: Patti F. Fraser, 48 Huron St, Brantford, ON (CA) N3S 2J6; Kelly J. Fraser, 48 Huron St, Brantford, ON (CA) N3S 2J6

( * ) Notice: Subject to any disclaimer, the term of this patent is extended or adjusted under 35 U.S.C. 154(b) by 363 days.

(21) Appl. No.: 10/441,291

(22) Filed: May 15, 2003

(51) Int. Cl.
*A01K 29/00* (2006.01)

(52) U.S. Cl. ........................................ 119/165; 119/167

(58) Field of Search ................. 119/161, 165, 170, 119/167, 166; D30/161, 160; 206/423, 532, 206/535, 538, 546, 577, 503; 220/4.08, 4.09, 220/4.22, 4.28, 4.29
See application file for complete search history.

(56) References Cited

U.S. PATENT DOCUMENTS

| | | | | |
|---|---|---|---|---|
| 3,581,975 A | * | 6/1971 | Roccop | 119/165 |
| 3,796,188 A | * | 3/1974 | Bradstreet | 119/166 |
| 4,027,625 A | * | 6/1977 | Wheeler | 119/170 |
| 4,271,544 A | * | 6/1981 | Hammond | 119/165 |
| 4,615,300 A | * | 10/1986 | McDonough | 119/167 |
| 4,771,731 A | * | 9/1988 | Derx et al. | D30/161 |
| 4,802,442 A | * | 2/1989 | Wilson | 119/166 |
| 5,123,540 A | * | 6/1992 | Karavias | 206/546 |
| 5,394,835 A | * | 3/1995 | Gatta | 119/170 |
| 6,295,948 B1 | * | 10/2001 | Bowron | 119/165 |
| 6,408,790 B1 | * | 6/2002 | Maguire | 119/165 |
| 6,439,161 B1 | * | 8/2002 | Clemmons | 119/165 |
| 2002/0029993 A1 | * | 3/2002 | Wang | 206/546 |
| 2004/0026296 A1 | * | 2/2004 | Nesting | 206/577 |
| 2004/0069787 A1 | * | 4/2004 | Gruennert et al. | 220/503 |

* cited by examiner

*Primary Examiner*—Peter M. Poon
*Assistant Examiner*—Elizabeth Shaw

(57) ABSTRACT

A cat litter box is provided, comprising four side walls connected in a rectangular shape, a rounded top edge, two hinged bottom trap doors, and protective edges connected to the bottom trap doors to keep litter from emptying when the doors are closed. The cat litter box has particular utility in connection with quickly and completely emptying all litter contents from the box through the bottom trap doors when the cat litter box is lifted.

9 Claims, 3 Drawing Sheets

CAT LITTER BOX

BACKGROUND OF THE INVENTION

1. Field of the Invention

The present invention relates to a cat litter box for use in connection with domestic pets. The cat litter box has particular utility in connection with quickly and completely emptying all litter contents from the box through a bottom trap door.

2. Description of the Prior Art

Cat litter boxes are desirable for quickly and completely disposing of animal waste and litter.

The use of litter boxes is known in the prior art. For example, U.S. Pat. No. 4,771,731 to Derx et al. discloses a litter box. However, the Derx '731 patent does not provide a bottom trap door for easy emptying.

U.S. Pat. No. 5,983,832 to Seo discloses a cat litter box with bag system. However, the Seo '832 patent does not provide a bottom trap door for easy emptying.

U.S. Pat. No. 5,216,979 to Sallee et al. discloses a toilet bowl mountable trap door cat litter box. However, the Sallee '979 patent does not provide a simple design for use in any location.

U.S. Pat. No. 5,758,601 to Dickson discloses a disposable litter box for cats and other household pets. However, the Dickson '601 patent does not provide a bottom trap door for easy emptying.

U.S. Pat. No. Des. 346,887 to Desveaux discloses a cat litter box. However, the Desveaux '887 patent does not provide a bottom trap door for easy emptying.

U.S. Pat. No. 4,327,667 to Bilak discloses a cat toilet assembly. However, the Bilak '667 patent does not provide a simple design to empty the assembly quickly and completely by just lifting it up.

Lastly, U.S. Pat. No. 6,286,457 to Sugahara discloses a self-cleaning litter box. However, the Sugahara '457 patent does not provide a bottom trap door for easy emptying.

While the above-described devices fulfill their respective, particular objectives and requirements, the aforementioned patents do not describe a simple design for a cat litter box that is suitable for use in any location and allows all litter contents to be quickly and completely emptied from the box through a bottom trap door by simply lifting up the box. The prior art patents make no provision for a simple design for use in any location, with a bottom trap door to empty the unit quickly and completely by just lifting it up.

Therefore, a need exists for a new and improved cat litter box that can be used for quickly and completely emptying all litter contents from the box through a bottom trap door. In this regard, the present invention substantially fulfills this need. In this respect, the cat litter box according to the present invention substantially departs from the conventional concepts and designs of the prior art, and in doing so provides an apparatus primarily developed for the purpose of quickly and completely emptying all litter contents from the box through a bottom trap door.

SUMMARY OF THE INVENTION

In view of the foregoing disadvantages inherent in the known types of litter boxes now present in the prior art, the present invention provides an improved cat litter box, and overcomes the above-mentioned disadvantages and drawbacks of the prior art. As such, the general purpose of the present invention, which will be described subsequently in greater detail, is to provide a new and improved cat litter box and method which has all the advantages of the prior art mentioned heretofore and many novel features that result in a cat litter box which is not anticipated, rendered obvious, suggested, or even implied by the prior art, either alone or in any combination thereof.

To attain this, the present invention essentially comprises a cat litter box, comprising a continuous side wall, and two bottom trap doors connected to the continuous side wall.

In one embodiment, the present invention comprises a cat litter box, comprising a continuous side wall, a rounded top edge connected to the continuous side wall, and two hinged bottom trap doors connected to the continuous side wall.

In another embodiment, the present invention comprises a cat litter box, comprising four side walls connected in a rectangular shape, a rounded top edge connected to the side walls, two hinged bottom trap doors connected to the side walls, and a plurality of protective edges connected to the bottom trap doors.

There has thus been outlined, rather broadly, the more important features of the invention in order that the detailed description thereof that follows may be better understood and in order that the present contribution to the art may be better appreciated.

The invention may also include protective edges, a litter bag, and litter. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cat litter box that has all of the advantages of the prior art litter boxes and none of the disadvantages.

It is another object of the present invention to provide a new and improved cat litter box that may be easily and efficiently manufactured and marketed.

An even further object of the present invention is to provide a new and improved cat litter box that has a low cost of manufacture with regard to both materials and labor, and which accordingly is then susceptible of low prices of sale to the consuming public, thereby making such cat litter box economically available to the buying public.

Still another object of the present invention is to provide a new cat litter box that provides in the apparatuses and methods of the prior art some of the advantages thereof, while simultaneously overcoming some of the disadvantages normally associated therewith.

Even still another object of the present invention is to provide a cat litter box for quickly emptying all litter contents from the box through a bottom trap door. This allows the litter box to be emptied without mess or bother.

Still yet another object of the present invention is to provide a cat litter box for completely emptying all litter contents from the box through a bottom trap door. This makes it possible to immediately refill the entire box with fresh contents.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
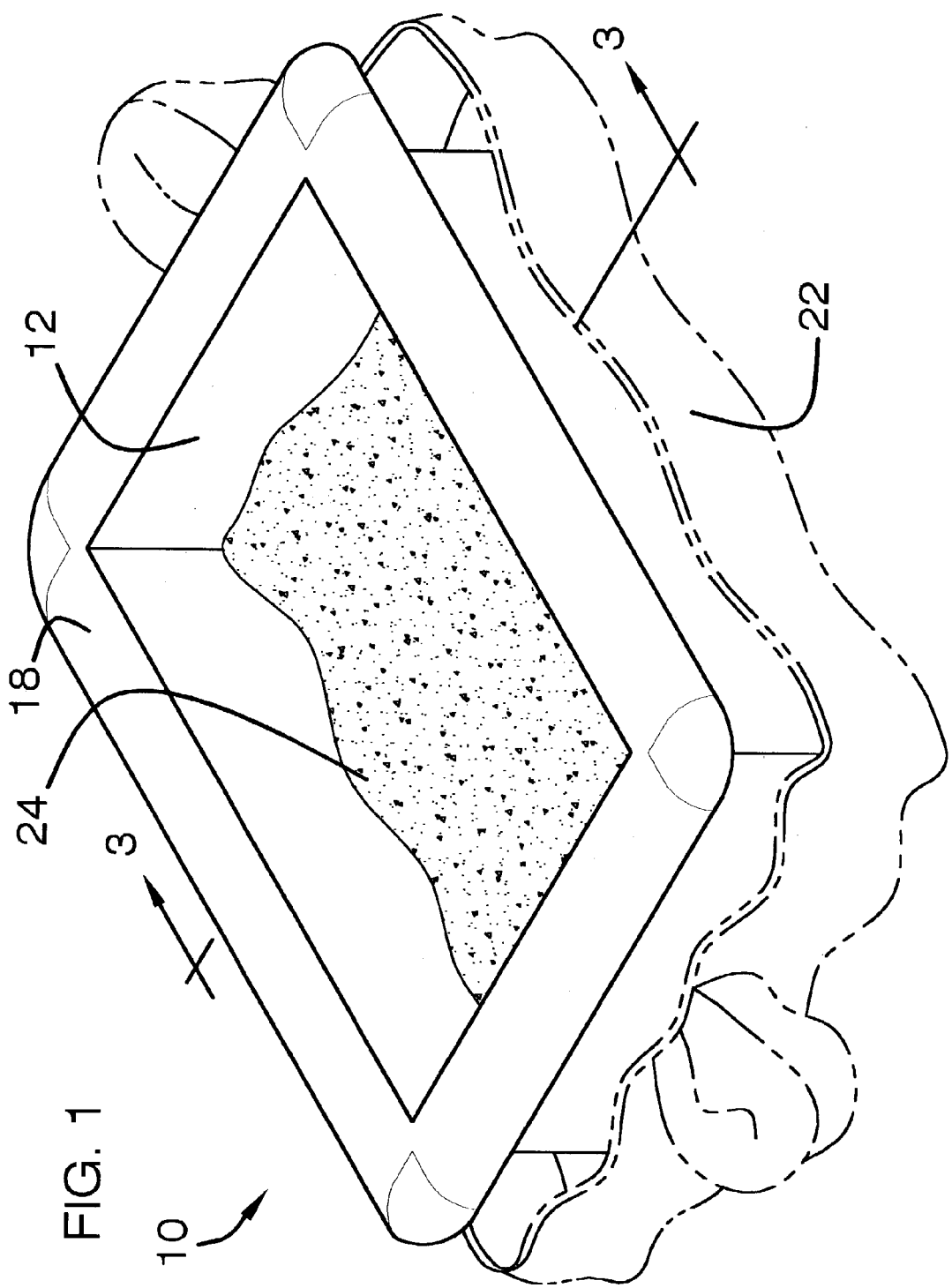
FIG. 1 is an isometric perspective view of the preferred embodiment of the cat litter box constructed in accordance with the principles of the present invention.
Figure 2:
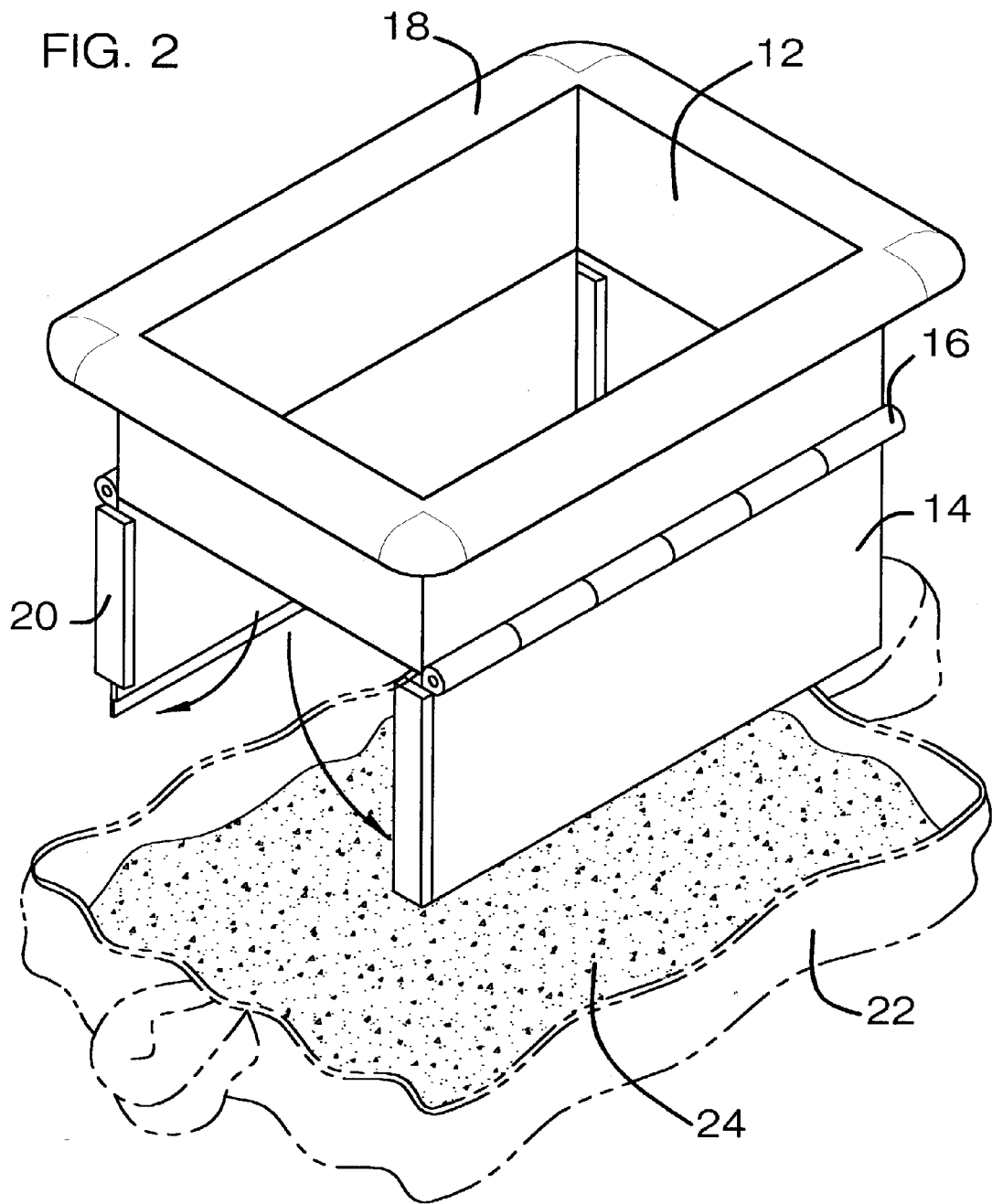
FIG. 2 is an isometric perspective view of the cat litter box of the present invention in its lifted configuration with the bottom trap doors open.
Figure 3:
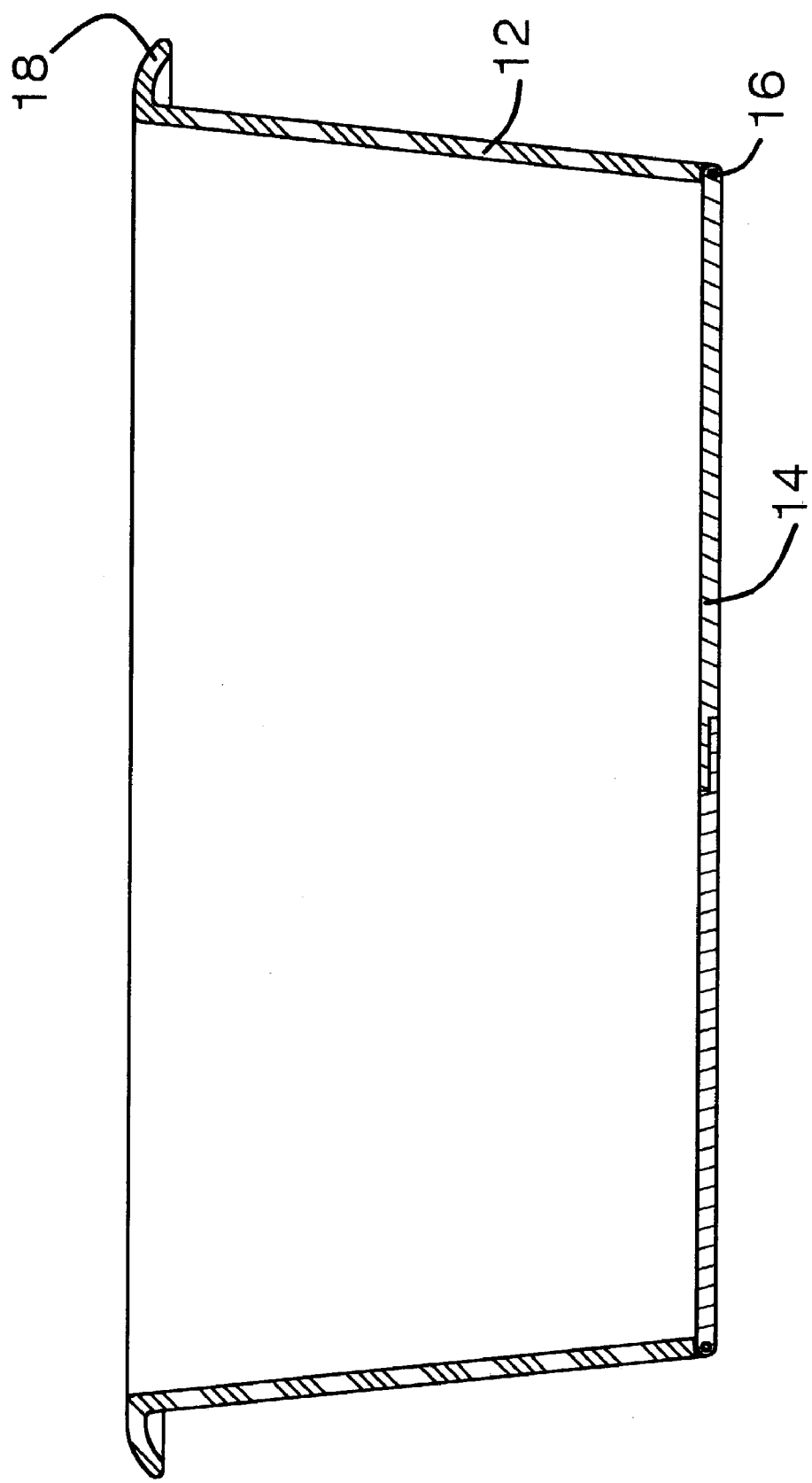
FIG. 3 is a front elevational cross-sectional view of the cat litter box of the present invention illustrated in FIG. 1 and taken along the line 3—3.

Referring now to the drawings, and particularly to FIGS. 1–3, a preferred embodiment of the cat litter box of the present invention is shown and generally designated by the reference numeral 10.

In FIG. 1, a new and improved cat litter box 10 of the present invention for quickly and completely emptying all litter contents from the box through a bottom trap door is illustrated and will be described. More particularly, in this embodiment the cat litter box 10 comprises four side walls 12 connected in a rectangular shape, a rounded top edge 18 connected to the side walls 12, two hinged bottom trap doors underneath the litter 24, a litter bag 22 underneath the trap doors, and protective edges connected to the bottom trap doors to keep the litter 24 from emptying when the doors are closed.

FIG. 2 is an isometric perspective view of the cat litter box of the present invention in its lifted configuration with the bottom trap doors 14 open, and illustrates the side walls 12, bottom trap doors 14 connected to the side walls 12 with hinges 16, a rounded top edge 18 which can be used as a handle connected to the side walls 12, protective edges 20 connected to the bottom trap doors 14 to keep litter 24 from emptying when the bottom trap doors 14 are closed, and the emptied litter 24 in a litter bag 22 underneath the opened bottom trap doors 14.

FIG. 3 is a front elevational cross-sectional view of the cat litter box of the present invention, and illustrates the side walls 12, bottom trap doors 14, hinges 16, and rounded top edge 18. One of the hinged doors has a flap on its edge which sits on a lip of the other door to prevent litter from emptying through the bottom until the box is lifted and the hinged doors are opened.

The cat litter box may comprise plastic. Suitable plastics include molded poly(vinyl chloride) (PVC), polystyrene (PS), polypropylene (PP), a polyethylene (PE) such as high density polyethylene (HDPE), an acrylonitrile-butadiene-styrene (ABS) resin, a styrene-acrylonitrile (SAN) resin, polycarbonate (PC), a polyester such as polyethylene terephthalate (PET) or polybutylene terephthalate (PBT), or blends thereof, as well as any other suitable plastic material known to those skilled in the art.

The cat litter box of the present invention is a specially designed litter box that is used to quickly and easily empty and replace the litter. In one embodiment, the cat litter box is produced from plastic and measures approximately 24 inches long and about 16 inches wide, and features side handles and rounded edge flaps to prevent litter spillage. A rounded top edge connected to the side walls of the box can be used as a handle grip around the entire periphery of the box. The bottom of the box features a hinged trap-door design, with at least one trap door that opens downward when desired. In some embodiments, the cat litter box comprises two hinged doors that open downward when desired. In certain embodiments, one of the hinged doors has a flap on its edge which sits on a lip of the other door to prevent litter from emptying through the bottom until the box is lifted and the hinged doors are opened. In other embodiments, protective edges at the bottom corners of the box or the sides of the doors keep litter from emptying between the sides of the box and the bottom doors when the doors are closed.

To use the cat litter box of the present invention, a litter bag is placed underneath the box, and the unit is filled with litter. When it is time to change the litter, the user simply grips the handles, releases the trap doors, and lifts the box upward. All the litter is then deposited in the bag, which is discarded. A new bag is placed under the box, and the unit is refilled with fresh litter. The cat litter box of the present invention fulfills the need for a unit that provides for quick and easy changing of soiled litter in a cat litter box. The appealing features of the cat litter box include its hygienic value, convenience, practicality, durability, and ease of use. The plastic design makes the unit lightweight, relatively inexpensive, and easy to clean. It can be produced in a selection of sizes and colors and with decorative designs and printing.

With the cat litter box of the present invention, a pet owner can easily and cleanly remove cat litter from the litter box. By allowing the user to remove and change the litter all at once, this product is more efficient and easier to use than the sifting scoops now used by many cat owners. By making the process of removing used litter more convenient, this product makes the user more inclined to clean the litter box. This product has particular utility for cat owners who have found that conventional boxes are difficult to clean and are unsanitary.

In one embodiment, the cat litter box comprises a continuous side wall, and two bottom trap doors connected to the continuous side wall.

In another embodiment, the cat litter box comprises a continuous side wall, a rounded top edge connected to the continuous side wall, and two hinged bottom trap doors connected to the continuous side wall.

In yet another embodiment, the cat litter box comprises four side walls connected in a rectangular shape, a rounded top edge connected to the side walls, two hinged bottom trap doors connected to the side walls, and a plurality of protective edges connected to the bottom trap doors.

In still another embodiment, the cat litter box further comprises litter. A litter bag may be placed under the trap doors to facilitate emptying and disposal. Protective edges along the bottom periphery of the side walls can be employed to help keep litter from emptying when the doors are closed. Lifting the cat litter box completely empties all contents of the cat litter box through the trap doors.

In use, it can now be understood that the cat litter box of the present invention has particular utility in connection with quickly and completely emptying all litter contents from the box through a bottom trap door.

While a preferred embodiment of the cat litter box has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, composite material, or a variety of wood may be used instead of the plastic described. Also, the hinges may be made of heavy-duty plastic, metal, or other suitable material known to those of skill in the art. And although quickly and completely emptying all litter contents from the box through a bottom trap door has been described, it should be appreciated that the cat litter box herein described is also suitable for many different uses in situations where it is desirable to empty all contents of a box after use. Furthermore, the cat litter box has utility for a wide variety of pets instead of the use for a cat which is described, and the cat litter box may have many different shapes other than the rectangular and square shapes described. In addition, it is to be understood that the various described embodiments may be combined.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cat litter box, comprising:
   a continuous side wall;
   two bottom trap doors having opposing ends with one end connected to said continuous side wall and said opposing end of said trap doors being frictionally engaged with one another, wherein said trap doors open and close together; and
   a protective edge connected to each said bottom trap door.

2. A cat litter box, comprising:
   a continuous side wall; and
   two bottom trap doors having opposing ends with one end connected to said continuous side wall and said opposing end of said trap doors being frictionally engaged with one another, wherein lifting said cat litter box completely empties all contents of said cat litter box through said trap doors.

3. A cat litter box, comprising:
   a continuous side wall;
   a rounded top edge connected to said continuous side wall;
   two hinged bottom trap doors connected to said continuous side wall; and
   a plurality of protective edges connected to said bottom trap doors, wherein lifting said cat litter box completely empties all contents of said cat litter box through said trap doors.

4. A cat litter box, comprising:
   a continuous side wall;
   a rounded top edge connected to said continuous side wall; and
   two hinged bottom trap doors having opposing ends with one end connected to said continuous side wall and said opposing end of said trap doors being frictionally engaged with one another, wherein lifting said cat litter box completely empties all contents of said cat litter box through said trap doors.

5. A cat litter box, comprising:
   four side walls connected in a rectangular shape;
   a rounded top edge connected to said side walls;
   two hinged bottom trap doors connected to said side walls; and
   a plurality of protective edges connected to said bottom trap doors, wherein lifting said cat litter box completely empties all contents of said cat litter box through said trap doors.

6. The cat litter box of claim 5, further comprising a litter bag underneath said bottom trap doors.

7. The cat litter box of claim 5, further comprising liner inside said cat litter box.

8. The cat litter box of claim 5, further comprising a plurality of protective edges along the bottom periphery of said side walls.

9. The cat litter box of claim 5, comprising plastic.

* * * * *